(12) United States Patent
Randall

(10) Patent No.: US 12,384,119 B2
(45) Date of Patent: Aug. 12, 2025

(54) METHOD OF MANUFACTURING A ROOT RING FOR A WIND TURBINE BLADE

(71) Applicant: Vestas Wind Systems A/S, Aarhus N. (DK)

(72) Inventor: Stephen Randall, Cowes (GB)

(73) Assignee: Vestas Wind Systems A/S, Aarhus (DK)

( * ) Notice: Subject to any disclaimer, the term of this patent is extended or adjusted under 35 U.S.C. 154(b) by 0 days.

(21) Appl. No.: 18/867,077

(22) PCT Filed: May 23, 2023

(86) PCT No.: PCT/DK2023/050125
§ 371 (c)(1),
(2) Date: Nov. 19, 2024

(87) PCT Pub. No.: WO2023/227180
PCT Pub. Date: Nov. 30, 2023

(65) Prior Publication Data
US 2025/0205976 A1  Jun. 26, 2025

(30) Foreign Application Priority Data
May 24, 2022 (DK) .......................... PA 2022 70273

(51) Int. Cl.
*B29C 70/18* (2006.01)
*B29C 63/12* (2006.01)
(Continued)

(52) U.S. Cl.
CPC .............. *B29C 70/18* (2013.01); *B29C 63/12* (2013.01); *F03D 1/066* (2023.08); *F03D 1/0662* (2023.08);
(Continued)

(58) Field of Classification Search
CPC ......... B29C 70/18; B29C 63/12; F03D 1/066; F03D 1/0662; B29K 2105/0872; B29L 2031/085; F05B 2230/60
See application file for complete search history.

(56) References Cited

U.S. PATENT DOCUMENTS

| 5,660,527 A | 8/1997 | Deering et al. |
| 8,408,875 B2 * | 4/2013 | Quell ............ F03D 1/0658 |
| | | 416/204 R |

(Continued)

FOREIGN PATENT DOCUMENTS

| EP | 2677170 A1 | 12/2013 |
| EP | 2746572 A2 | 6/2014 |

(Continued)

OTHER PUBLICATIONS

Danish Patent and Trademark Office, technical examination issued in corresponding DK Application No. PA 2022 70273, dated Nov. 24, 2022.

(Continued)

*Primary Examiner* — Ryan J. Walters
(74) *Attorney, Agent, or Firm* — Wood Herron & Evans LLP

(57) ABSTRACT

A method of manufacturing a root ring for a wind turbine blade comprising winding metal sheet material onto a mandrel to form a metal section proximate a hub end of the root ring. Sheet fibre material is also wound onto the mandrel to form a fibre section of the root ring proximate a tipwards end of the root ring. The metal sheet material is interleaved with the sheet fibre material to form a transition section of the root ring between the metal section and the fibre section.

13 Claims, 10 Drawing Sheets

(51) Int. Cl.
    *F03D 1/06*         (2006.01)
    *B29K 105/08*     (2006.01)
    *B29L 31/08*      (2006.01)

(52) U.S. Cl.
    CPC . *B29K 2105/0872* (2013.01); *B29L 2031/085* (2013.01); *F05B 2230/60* (2013.01)

(56) References Cited

U.S. PATENT DOCUMENTS

| | | | | |
|---|---|---|---|---|
| 10,190,571 | B2 * | 1/2019 | Samudrala | F03D 1/0658 |
| 10,487,662 | B2 * | 11/2019 | Dahl | F01D 5/12 |
| 11,969,959 | B2 * | 4/2024 | Rodwell | B29C 70/42 |
| 2012/0148404 | A1 | 6/2012 | Quell et al. | |

FOREIGN PATENT DOCUMENTS

| | | |
|---|---|---|
| EP | 2697483 B1 | 7/2016 |
| WO | 2012140039 A2 | 10/2012 |

OTHER PUBLICATIONS

International Searching Authority, International Search Report and WRitten Opinion issued in corresponding PCT Application No. PCT/DK 2023/050125, dated Sep. 1, 2023.

* cited by examiner

METHOD OF MANUFACTURING A ROOT RING FOR A WIND TURBINE BLADE

TECHNICAL FIELD

The present disclosure relates to a wind turbine blade and to a method of making a root ring for a wind turbine blade.

BACKGROUND

Wind turbine blades for large horizontal axis wind turbines have significant mass, perhaps in the region of 10 tonnes or more, up to 30 tonnes or more. Wind turbine blades are fastened to a pitch bearing of a hub to make up a rotor which rotates on a main shaft to drive a generator. A blade is typically connected to the inner or outer ring of the pitch bearing using a plurality of circumferentially spaced bolts which extend into a root end of the blade in a direction parallel to a central axis of the root end of the blade. The stresses on the blade connection to the pitch bearing are considerable, owing chiefly to blade mass and wind force, as well as the effect of perpetual rotation of the rotor, which tends to vary the degree and direction of the forces on the blade with every rotation of the rotor. Vibrations in the system can also be considerable.

With an expected lifetime of 20 years or more, the fatigue performance of the blade connection to the pitch bearing is critical. The bolts are typically connected to the blade root via threaded metal bushings embedded into the fibre composite material of the root end of the blade. Such bushings are usually cylindrical, often made of steel. The bushings transfer the loads from the composite materials of the blade to the bolts which then transfer the loads to the hub via the pitch bearing.

Considering the load bearing and fatigue requirements placed on the blade connection to the pitch bearing, the manner of connecting the blade root to the pitch bearing is critical. However, in known methods of attachment the component parts are not used in an optimal way resulting in over engineering and the use of large safety factors. For example, the bushings described above are typically held in place by adhesive which, in use, is subject to constantly varying tensile forces. It is well known that adhesives are not optimally suited to such conditions. Similarly, the bolts connecting the pitch bearing to the blade bear tensile and bending loads rather than shear loads to which they are better suited.

It is desirable to increase the length of wind turbine blades so that each wind turbine can extract more energy from the wind to help reduce our reliance on fossil fuels. However, the current method of blade/hub connection described above limits the extent to which this can be achieved.

FIG. 1 shows a schematic view of a prior art wind turbine blade construction. The wind turbine blade 10 shown in FIG. 1 comprises a blade shell 13 which is made up of windward 17 and leeward 18 half-shells which are connected together to form the blade shell 13. Both half-shells comprise a glass fibre composite root 9 with the remainder of the half shells 17, 18 being made up of balsa wood and/or polyurethane foam core material which is adhered to a glass fibre composite skin.

Each half-shell 17, 18 comprises one or more spanwise extending beams or spar caps 22 to provide bending strength to the wind turbine blade 10. The spar caps 22 typically comprise carbon fibre composite due to its lightweight and stiff material properties. Shear webs (not shown) extend between opposing spar caps 22 on the windward 17 and leeward 18 sides of the blade shell 13 and may be made of glass fibre composite. The shear webs bear the shear loads of the wind turbine blade 10.

The majority of the loads carried by the wind turbine blade 10 are carried in substantially straight load paths by the spar caps 22. These loads must be transferred to the wind turbine hub via the root 9 and the pitch bearing. The root 9 is attached to the pitch bearing by a plurality of circumferentially spaced bolts 15 located in a ring around the root end 12 of the root 9. To avoid undesirable load peaks which may cause material failure, it is necessary to gradually spread the loads from the spar caps 22 around the full circumference of the root end 12. To achieve this, a large amount of glass fibre composite is required in the region between the ends 24 of the spar caps 22 and the root end 12. In addition, the ends 24 of the spar caps 22 must be positioned at a sufficient spanwise distance away from the root end 12 so that the loads can be sufficiently distributed around the full circumference of the root end 12. This is illustrated schematically in FIG. 1 by load lines 20.

It is desirable to increase the amount of load that the root of a wind turbine blade is able to carry. However, current methods of wind turbine blade design and construction limit the extent to which this can be achieved.

It is against this background that the present invention has been developed.

SUMMARY OF THE INVENTION

The present invention provides a method of manufacturing a root ring for a wind turbine blade, the root ring comprising a hub end and a tipwards end, the root ring extending in a spanwise direction from the hub end to the tipwards end, the method comprising: winding metal sheet material onto a mandrel to form a metal section proximate the hub end of the root ring; winding sheet fibre material onto the mandrel to form a fibre section proximate the tipwards end of the root ring; and interleaving the metal sheet material with the sheet fibre material to form a transition section of the root ring, wherein the transition section is located between the metal section and the fibre section.

The method of winding the sheet materials on to the mandrel is advantageous as it allows for multiple layers to be formed quickly without the need for large amounts of manual labour.

Optionally the method comprises overlapping the metal sheet material with the sheet fibre material before the metal sheet and sheet fibre materials are wound on to the mandrel. In this way the metal and fibre sheet material may be efficiently wound onto the mandrel in the same process step.

The method optionally comprises winding a layer of metal sheet material onto the mandrel before winding a layer of sheet fibre material onto the mandrel thereby providing another choice for manufacture of the root ring.

In one example, the method comprises treating at least part of the surface of the metal sheet material to alter the surface finish of the metal sheet material before it is wound onto the mandrel. Optionally, all or part of the surface of the metal sheet material may be roughened before being wound onto the mandrel. Treatment of all or part of the surface of the metal sheet material may beneficially increase the friction between the layers of metal sheet material in the metal section, and help improve the bond between the metal sheet material and the fibre composite material in the finished root ring.

The metal sheet material may comprises a first portion located adjacent a first edge of the metal sheet material, and a second portion located adjacent a second edge of the metal sheet material, wherein the thickness of the second portion tapers away from the first portion towards the second edge of the metal sheet material, the method comprising winding the metal sheet material onto the mandrel so that the first portion of the metal sheet material is located in the metal section of the root ring, and the second portion of the metal sheet material is located in the transition section of the root ring. In this way, the portions of the layers of metal sheet material located in the transition section taper from the metal section towards the tipwards end of the root ring thereby reducing geometric stress concentrators between the transition section and the fibre section.

In one example the sheet fibre material comprises pre-impregnated sheet fibre material, wherein the method comprising curing the pre-impregnated sheet fibre material after it has been wound onto the mandrel. The use of pre-impregnated sheet fibre material is advantageous as it removes the need for a separate resin infusion step.

Optionally the sheet fibre material comprises dry sheet fibre material, wherein the method comprises infusing the sheet fibre material with resin after it has been wound onto the mandrel and curing the resin. Depending on the design of the wind turbine blade, a resin infusion method of manufacture may be desirable.

The method optionally comprises winding a greater thickness of sheet fibre material onto the mandrel at an end of the fibre section located proximate the transition section than is wound onto the mandrel at an opposing end of the fibre section located proximate the tipwards end of the root ring such that the thickness of the fibre section tapers towards the tipwards end of the root ring. In this way, the fibre section of the root ring may be manufactured with a tapered profile which is beneficial when integrating the root ring into the wind turbine blade.

The method may comprise machining an outer surface of the fibre section to form a tapered wall thickness profile in the fibre section of the root ring. Machining may be used to form the tapered section from a non-tapered fibre section, or a tapered fibre section which has been formed during the winding process may be further tapered and/or finished in the machining step.

In another aspect, the present invention provides a method of forming a wind turbine blade, the method comprising: forming a root ring using the method described above; removing the root ring from the mandrel; providing a windward half-shell and a leeward half-shell of a wind turbine blade shell, wherein the windward half-shell and the leeward half-shell each comprise a hubwards end and a tip end, wherein each half-shell extends in a spanwise direction from the hubwards end to the tip end; connecting the windward half-shell to the leeward half-shell to form a wind turbine blade shell; positioning the complete root ring at the hubwards ends of the windward half-shell and the leeward half-shell; and connecting the root ring to the windward half-shell and the leeward half-shell.

Optionally positioning the root ring at the hubwards ends of the windward half-shell and the leeward half-shell comprises positioning the root ring at least partially between the windward half-shell and the leeward half-shell.

Connecting the root ring to the windward half-shell and the leeward half-shell optionally comprises: laying one or more sheets of fibre material over the intersections between the root ring and the windward half-shell and the leeward half-shell; and curing a resin infiltrated or impregnated within the sheets of fibre material.

In one example connecting the root ring to the windward half-shell and the leeward half-shell comprises connecting the root ring to one of the windward or leeward half-shells before connecting the root ring to the other of the windward or leeward half-shells.

Within the scope of this application it is expressly intended that the various aspects, examples and alternatives set out in the preceding paragraphs, in the claims and/or in the following description and drawings, and in particular the individual features thereof, may be taken independently or in any combination. That is, all examples and/or features of any examples can be combined in any way and/or combination, unless such features are incompatible.

BRIEF DESCRIPTION OF THE DRAWINGS

Examples of the invention are described below with reference to the accompanying drawings in which:

FIG. 9b shows a schematic cross-sectional view of the manufacturing method of FIG. 9a;

FIG. 9c shows a schematic cross-sectional view of a layer of sheet metal material for use in the manufacturing method of FIG. 9a.

DETAILED DESCRIPTION

The following detailed description refers to the accompanying drawings that show, by way of illustration, specific details and examples in which the invention may be practiced. These examples are described in sufficient detail to enable those of ordinary skill in the art to practice the invention. Other examples may be utilised, and structural changes may be made without departing from the scope of the invention as defined in the appended claims.

Figure 1:
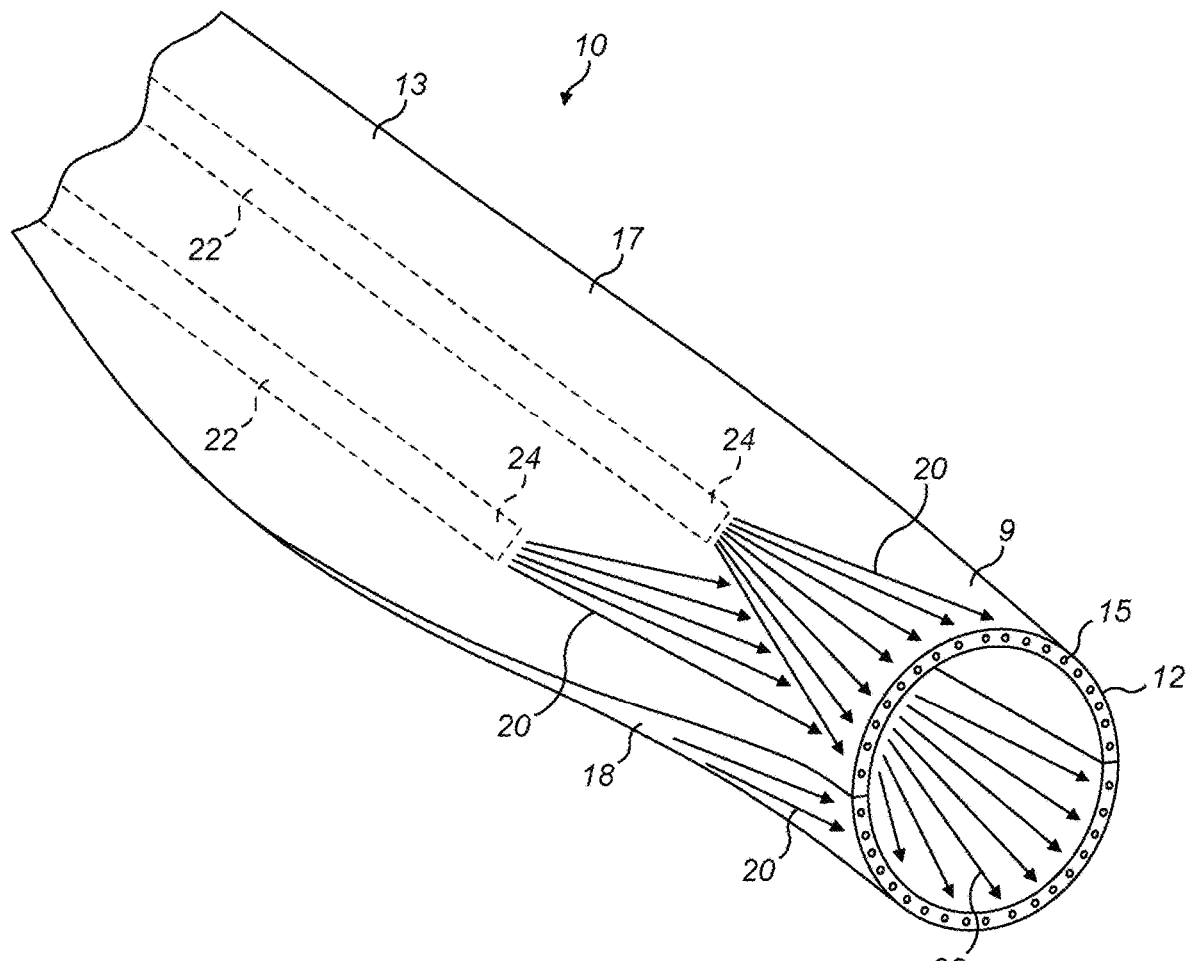
FIG. 1 shows a schematic view of part of a prior art wind turbine blade construction.
Figure 2:
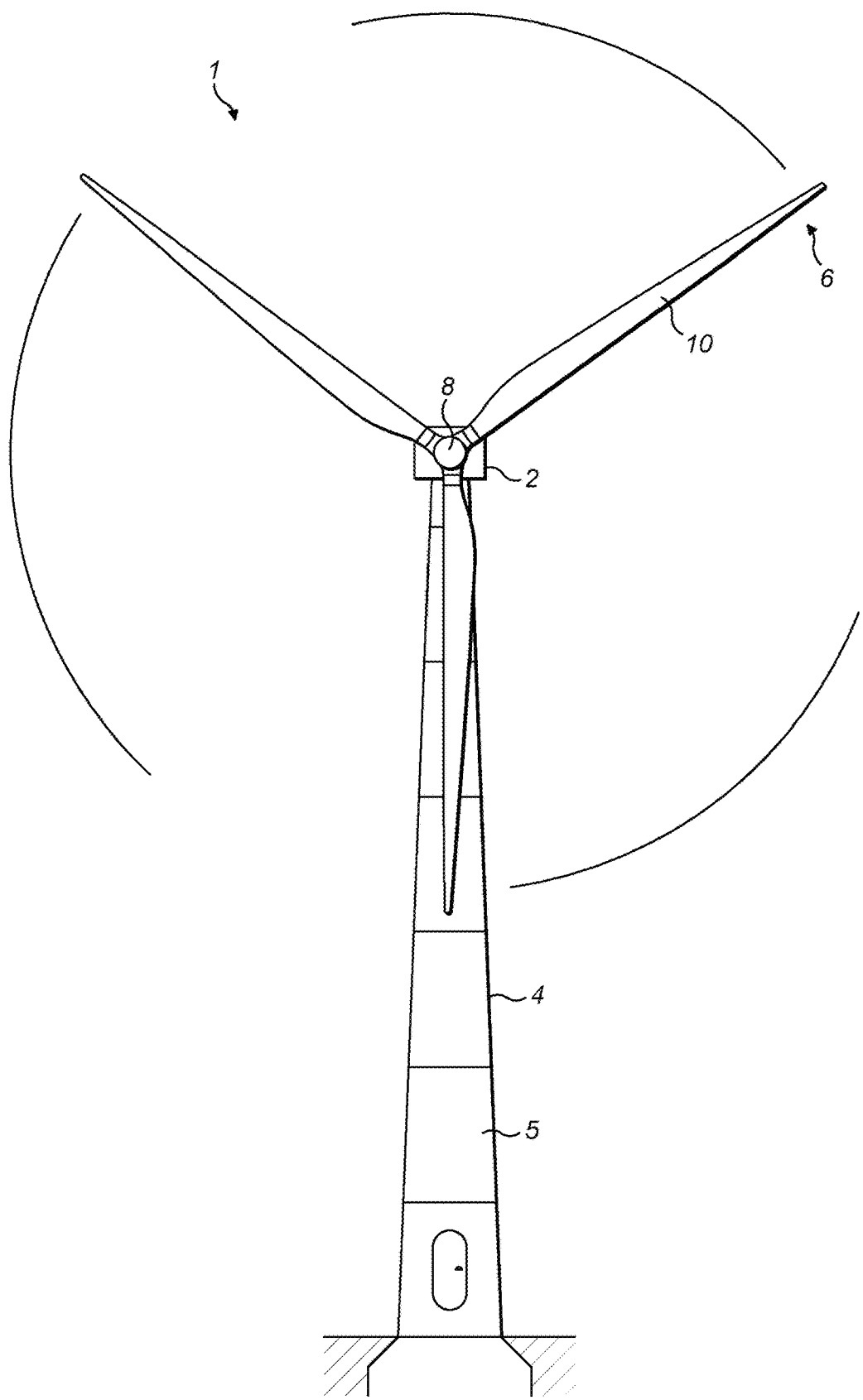
FIG. 2 shows a schematic view of a wind turbine.

FIG. 2 shows a wind turbine 1. The wind turbine 1 includes a nacelle 2 that is supported on a generally vertical tower 4, which itself comprises a plurality of tower sections 5. The nacelle 2 houses a number of functional components, including a gearbox and a generator (not shown), and supports a main rotor arrangement 6. The main rotor arrangement 6 comprises a hub 8 and a plurality of wind turbine blades 10 connected to the hub 8. In this example, the wind turbine 1 comprises three wind turbine blades 10.

Figure 3:
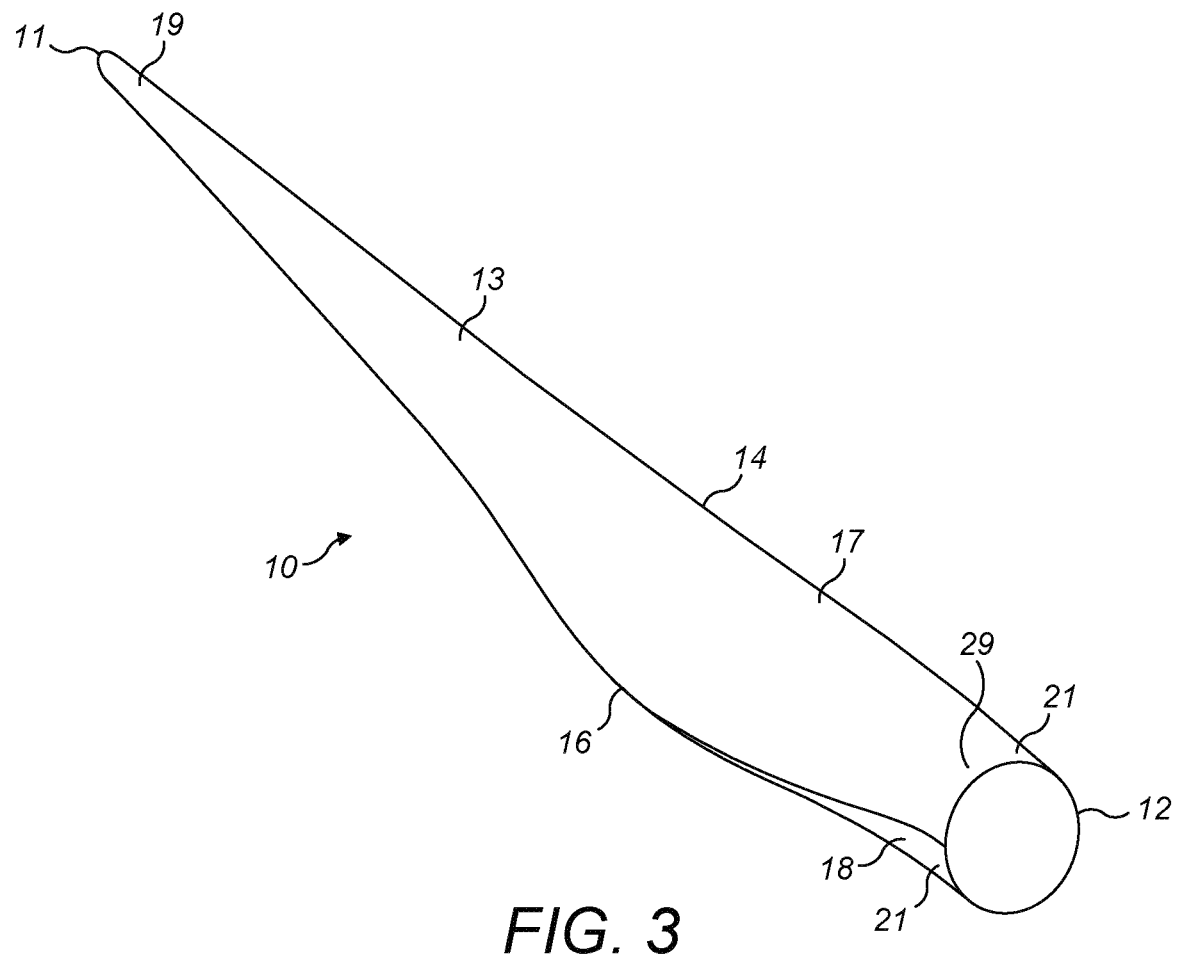
FIG. 3 shows a schematic view of a wind turbine blade.

FIG. 3 shows a schematic view of a wind turbine blade 10. The wind turbine blade 10 comprises a blade shell 13 made up of a windward half-shell 17 attached to a leeward half-shell 18. The wind turbine blade 10 extends from a root end 12 to a tip end 11 and each half-shell 17, 18 has a tip end 19 and a hubwards end 21. The root end 12 is configured for attachment to the hub 8. A leading edge 14 and a trailing edge 16 extend in a spanwise direction between the root end 12 and the tip end 11.

Figure 4:
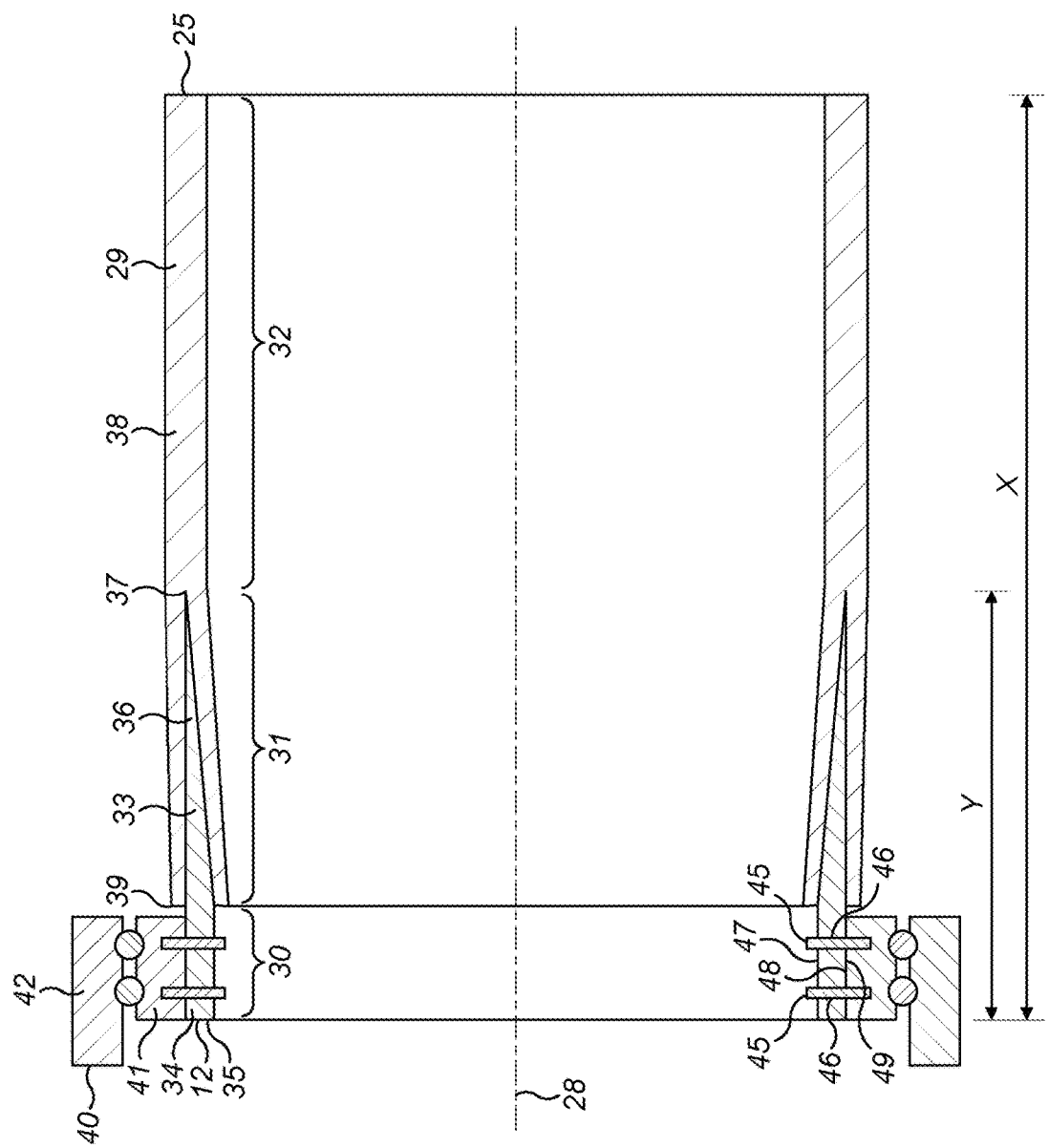
FIG. 4 shows a schematic cross-sectional view of a root end of a wind turbine blade attached to the inner ring of a pitch bearing.

FIG. 4 shows a schematic cross-sectional view of a root 29 of a wind turbine blade attached to the inner ring 41 of a pitch bearing 40. The root 29 comprises a tubular root portion having a proximal end 35 defining the root end 12 of the blade, and a distal end 25 located at a spanwise distance X from the proximal end 35. The root 29 comprises a metal section 30 which extends from the proximal end 35 of the root 29 towards the distal end 25 of the root 29, and a fibre composite section 32 which extends from the distal end 25 of the root 29 towards the proximal end 35 of the root 29. A transition section 31 extends between the metal section 30 and the fibre composite section 32. The terms "fibre" and "fiber" may be used interchangeably herein.

The metal section 30 is defined by a first portion 34 of a metal sheet 33. A second portion 36 of the metal sheet 33 extends from the first portion 34 into the transition section 31 such that the metal sheet 33 extends from the proximal end 35 of the root 29 to an outermost spanwise end 37 of the transition section 31 located at a spanwise distance Y from the proximal end 35. The metal sheet 33 is curved about a spanwise axis 28 of the root 29 such that the metal sheet follows the circumferential curve of the root end 12.

The first portion 34 of the metal sheet 33 may have a constant thickness, and the second portion 36 may have a varying thickness which tapers away from the first (or constant thickness) portion 34 towards the outermost spanwise end 37 of the transition section 31.

The second portion 36 of the metal sheet 33 located in the transition section 31 is encapsulated within fibre composite material 38 which is continuous with the fibre composite material 38 of the fibre composite section 32. The thickness of the fibre composite material 38 in the transition section 31 varies along the length of the transition section 31 such that the total thickness of the fibre composite material 38 at the innermost spanwise end 39 of the transition section 31 is less than the total thickness of the fibre composite material 38 at the outermost spanwise end 37 of the transition section 31. Consequently, the least thickness of fibre composite material 38 in the transition section 31 is located proximate the thickest section of the metal sheet 33 in the transition section 31, and the greatest thickness of fibre composite material 38 in the transition section 31 is located proximate the thinnest section of the metal sheet 33 in the transition section 31. In this example, the thickness of the root 29 may remain constant from the innermost spanwise end 39 of the transition section 31 to the outermost spanwise end 37 of the transition section 31. In other examples, the thickness of the root 29 may vary from the innermost spanwise end 39 to the outermost spanwise end 37 of the transition section 31 depending on design choice.

It will be understood that the thickness of the fibre composite material 38 shown in FIG. 4 is exaggerated for the sake of clarity and that the thickness of the transition section 31 along its spanwise extent may be largely the same as the first portion 34 of the metal sheet 33 forming the metal section 30. Nonetheless, it will also be understood that this is not essential and the relative thicknesses of the metal section 30, the transition section 31 and the fibre composite section 32 need not be the same depending on design choice.

The fibre composite material 38 is glass fibre composite which is a material commonly used in wind turbine blade manufacture. However, any suitable fibre composite material may be used. In one example the fibre material is pre-impregnated fibre material. In another example, the fibre material is dry fibre material which is infused with resin and cured to form the composite material 38.

The metal sheet 33 is thin relative to its spanwise dimension Y. For example, the thickness of the metal sheet 33 at the root end 35 may be 30 mm and its spanwise dimension may be 650 mm. Preferably the thickness of the metal sheet 33 is no more than 25% of its spanwise dimension. Preferably, the thickness of the metal sheet 33 is no greater than 10% of its spanwise dimension, more preferably no greater than 5% of its spanwise dimension, more preferably still no greater than 1% of its spanwise dimension, and most preferably no greater than 0.1% of its spanwise dimension. It is envisioned that the thickness of the metal sheet 33 at the root end 35 may be up to about 50 mm, and its spanwise dimension may be up to about 1000 mm. However, dimensions outside this range may be used provided that the thickness of the metal sheet 33 is no more than 25% of its spanwise dimension.

As will be described in greater detail below, the metal sheet 33 may be formed from a metal sheet which is wound around a mandrel to form a tubular structure. Alternatively, the metal sheet 33 may be one of a plurality of metal sheets 33 positioned side by side to form a tubular structure. In each case, the metal sheet or sheets may be connected together by any suitable method such as by welding or by interlocking formations located on the spanwise edges of the metal sheets. Alternatively, the metal sheet or sheets may be held in position by the fibre composite material 38 which encapsulates the varying thickness portion 36 of the metal sheet or sheets located in the transition section 31.

As shown in FIG. 4, the metal section 30 comprises an outer circumferential surface 48 which is in contact with an inner circumferential surface 49 of the inner ring 41 of the pitch bearing 4. The metal section 30 comprises a plurality of bolt holes 46 which extend radially with respect to the spanwise extending axis 28 of the metal section 30 through the metal section 30 from an inner circumferential surface 47 of the metal section 30 to the outer circumferential surface 48. The metal section 30 may be connected to the inner ring 41 of the pitch bearing 40 by radially extending bolts 45 which extend through the bolt holes 46 and into the bearing ring 41. As such, the bolts 45 bear loads predominantly in shear rather than in tension and bending as in prior art connection methods.

In the example described with reference to FIG. 4 the root 29 is connected to the inner ring 41 of the pitch bearing 40. It will be understood that this is not essential and that the root 29 may be connected to the outer ring 42 of the pitch bearing 40 in dependence on the particular pitch bearing design.

The circumferential surfaces of the metal section and of the inner and outer rings are surfaces which extend in the spanwise direction.

Four bolts 45 are shown in line with one another in the cross-sectional view of FIG. 4. However, it will be understood that this is an example only and that only two bolts 45, or more than four bolts 45, may be present in any particular spanwise cross-section of the root 29. It will be understood that metal section 30 of the root 29 is connected to the inner ring 41 of the pitch bearing 40 by a plurality of bolts 45 spaced around the entire periphery of the metal section 30. A friction connection also exists between the outer circumferential surface 48 of the metal section 30 and the inner circumferential surface 49 of the inner ring 41. This friction connection is created by the tensile forces produced by the bolts 45 when they are tightened. Because the metal section 30 and the bolts 45 are made of elastic metal material, both the metal section 30 and the bolts 45 deform slightly on tightening of the bolts such that a residual force is created as a result of the elastic material of the metal section 30 and the bolts 45 trying to regain their original shape. This is known as 'preloading'. The preloading forces cause the inner ring 41 and the metal section 30 to be drawn tightly together generating a friction force between them. This friction force serves to robustly secure the metal section 30 of the root 29 to the inner ring 41. This is an important enabler for the successful design and use of larger length wind turbine blades than is possible with prior art connection methods.

In an alternative example, the metal section 30 may be fully or partially covered by the fibre composite material 38 such that the inner ring 41 of the pitch bearing 40 contacts the fibre composite material 38 and not the metal sheet material 33 of the metal section 30. In this case, the cross-sectional area of the metal section 30 in a direction normal to its spanwise extending axis 28 may comprise at least 90% metal to create and sustain the preloading of the bolts 45 throughout the operational life of the wind turbine blade 10. Preferably the cross-sectional area of the metal section 30 may comprise at least 95% metal, more preferably at least 98% metal, and most preferably at least 99% metal.

If the cross-sectional area of the metal section 30 comprises less than 90% metal, the connection method described above and shown in FIG. 4 may still be used as the root 29 is still reliably secured to the inner race 41 by the bolts 45 predominantly bearing loads in shear.

In the example described above the root 29 may be connected to the inner 41 or outer 42 ring of the pitch bearing 40. It will be understood that the inner 41 or outer 42 ring may comprise one or more component parts connected together to form a complete ring 41, 42. For example, the pitch bearing ring 41, 42 may comprise a first portion connected to the root 29 in the same way as described with respect to FIG. 4 and a second portion connected between the first portion and the remainder of the pitch bearing 40. The first and second portions of the pitch bearing ring 41, 42 may be connected to one another by any suitable method including by connection of circumferential surfaces in a manner similar to the connection between the root end 29 and the first portion of the inner 41 or outer 42 ring. Alternatively, the first portion may be connected to the second portion by spanwise extending stud bolts. The use of pitch bearing rings 41, 42 comprising two or more component parts connected together is contemplated and suitable for all of the examples described herein.

Figure 5:
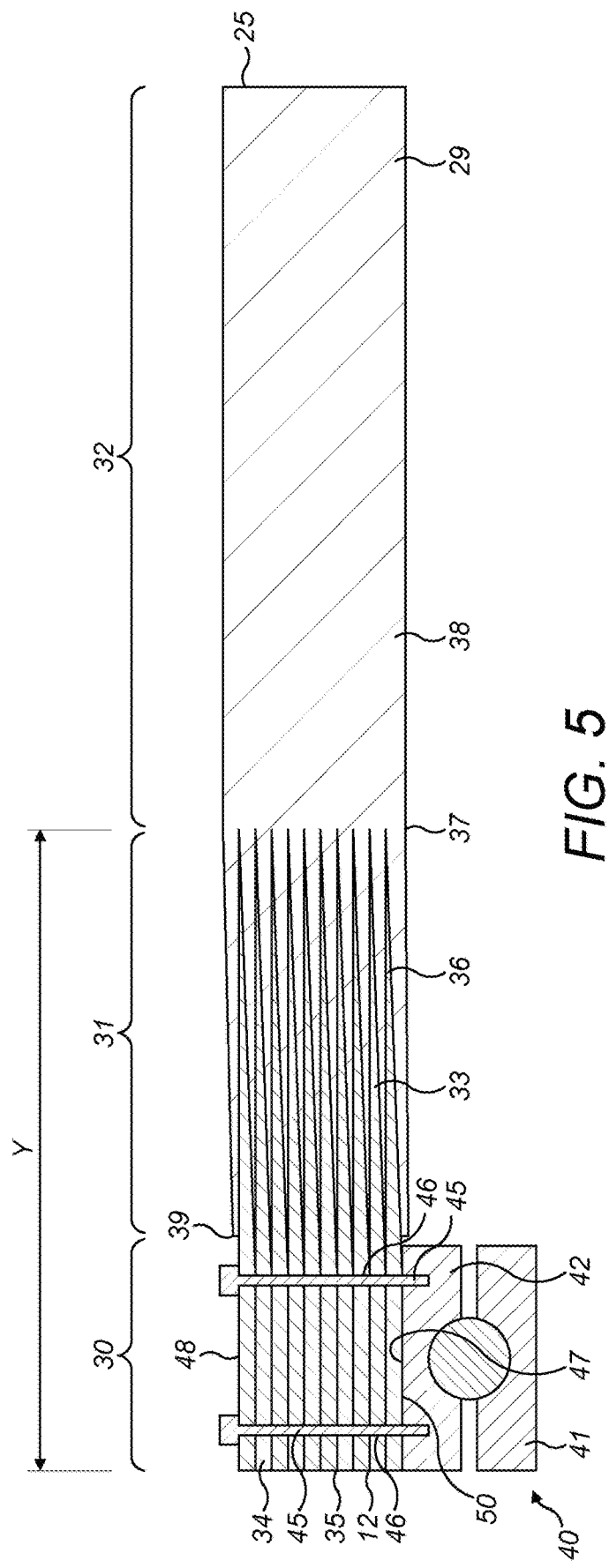
FIG. 5 shows a schematic partial cross-sectional view of an alternative root end construction attached to the outer ring of a pitch bearing.

FIG. 5 shows a schematic cross-sectional view of a root construction similar to the example of FIG. 4 in which the metal sheet 33 is replaced by a plurality of metal sheets 33. As such, the example construction of FIG. 5 is a preferred example of the example construction of FIG. 4.

By way of example only, the root 29 of FIG. 5 is attached to the outer ring 42 of the pitch bearing 40. It will be understood that in an alternative configuration the root 29 could be attached to the inner ring 41 of the pitch bearing 40. Note that like reference numerals have been used throughout this description to indicate like components.

The root 29 of FIG. 5 is the same in all respects to the root 29 of FIG. 4 except in that the root 29 of FIG. 5 comprises a plurality of metal sheets 33 arranged one on top of the other. As such, the root 29 comprises a metal section 30 which extends from the proximal end 35 of the root 29 towards the distal end 25 of the root 29, and a fibre composite section 32 which extends from the distal end 25 of the root 29 towards the proximal end 35 of the root 29. A transition section 31 extends between the metal section 30 and the fibre composite section 32.

The metal section 30 is defined by first portions 34 of the metal sheets 33. The second portions 36 of the metal sheets 33 extend into the transition section 31 such that each metal sheet 33 extends from the proximal end 35 of the root 29 to the outermost spanwise end 37 of the transition section 31 located at a spanwise distance Y from the proximal end 35. The metal sheets 33 are curved about the spanwise axis of the root 29 such that the metal sheets follow the circumferential curve of the root end 12.

The first portions 34 of each of the metal sheets 33 may have a constant thickness, and each of the second portions 36 may have a varying thickness which tapers away from the constant thickness portions 34 towards the outermost spanwise end 37 of the transition section 31.

The second portions 36 of the metal sheets 33 located in the transition section 31 are encapsulated within fibre composite material 38 which is continuous with the fibre composite material 38 of the fibre composite section 32. The second portions 36 of each of the metal sheets 33 is interleaved with the fibre composite material 38 in the transition section 31. In the example shown in FIG. 5, the fibre composite material forms the outermost layer of the transition section 31. In an alternative example, the second portion 36 of the metal sheets 33 may form the outermost layer of the transition section 31.

The metal sheets 33 are thin relative to their spanwise dimension Y. For example, the thickness of the metal sheets 33 may be 3 mm and their spanwise lengths may be 650 mm. Preferably the thickness of the metal sheets 33 is no more than 25% of their spanwise dimension. More preferably, the thickness of the metal sheets 33 no greater than 10% of their spanwise dimension, more preferably still no greater than 5% of their spanwise dimension, further more preferably no greater than 1% of their spanwise dimension, and most preferably no greater than 0.1% of their spanwise dimension. It is envisioned that the thickness of the metal sheets 33 may be as low as 0.5 mm, and that their spanwise dimension may be as low as 100 mm. However, dimensions outside this range may be used provided that the thickness of the metal sheets 33 is no more than 25% of their spanwise dimension.

The metal sheets 33 may be formed from a continuous metal sheet which is wound in a spiral around a mandrel to form a tubular structure. Alternatively, the metal sheets 33 may comprise a plurality of metal sheets 33 positioned side by side and one on top of another to form a tubular structure. In this case, the metal sheets 33 may be offset with respect to one another around the periphery of the tubular structure so that the edges of the metal sheets 33 in one layer do not align with the ends of the metal sheets 33 in a neighbouring layer. The metal sheets 33 may be connected together by any suitable method such as by welding or by interlocking formations located on the spanwise edges of the metal sheets 33. Alternatively, the metal sheets 33 may be held in position by the fibre composite material 38 which encapsulates the second portions 36 of the metal sheets 33 located in the transition section 31.

As described above in relation to FIG. 4, the preferred example of FIG. 5 comprises a plurality of bolt holes 46 which extend through the metal section 30. The metal section 30 is connected to the outer ring 42 of the pitch bearing 40 by radially extending bolts 45.

As discussed above in respect of the example of FIG. 4, a friction connection also exists between the inner surface 47 of the metal section 30 and the outer surface 50 of the outer ring 42. A friction connection also exists between the contacting surfaces of the plurality of metal sheets 33. As discussed above, the friction connections are created by the preloading of the bolts 45 when they are tightened.

In an alternative example, the metal section 30 may comprise a small amount composite material 38 located between one or more of the metal sheet layers, and/or on the outermost metal sheet layer, of the metal section 30. In this case, the cross-sectional area of the metal section 30 in a direction normal to a spanwise extending axis of the metal section 30 must comprise at least 90% metal to create and sustain the preloading of the bolts 45 throughout the operational life of the wind turbine blade 10. Preferably the cross-sectional area of the metal section 30 may comprise at least 95% metal, more preferably at least 98% metal, and most preferably at least 99% metal. As discussed above in respect of FIG. 4, if the cross-sectional area of the metal section 30 comprises less than 90% metal, the connection method described above and shown in FIG. 5 may still be used as the root 29 is still reliably secured to the outer ring 42 by the bolts 45 predominantly bearing loads in shear.

Figure 6:
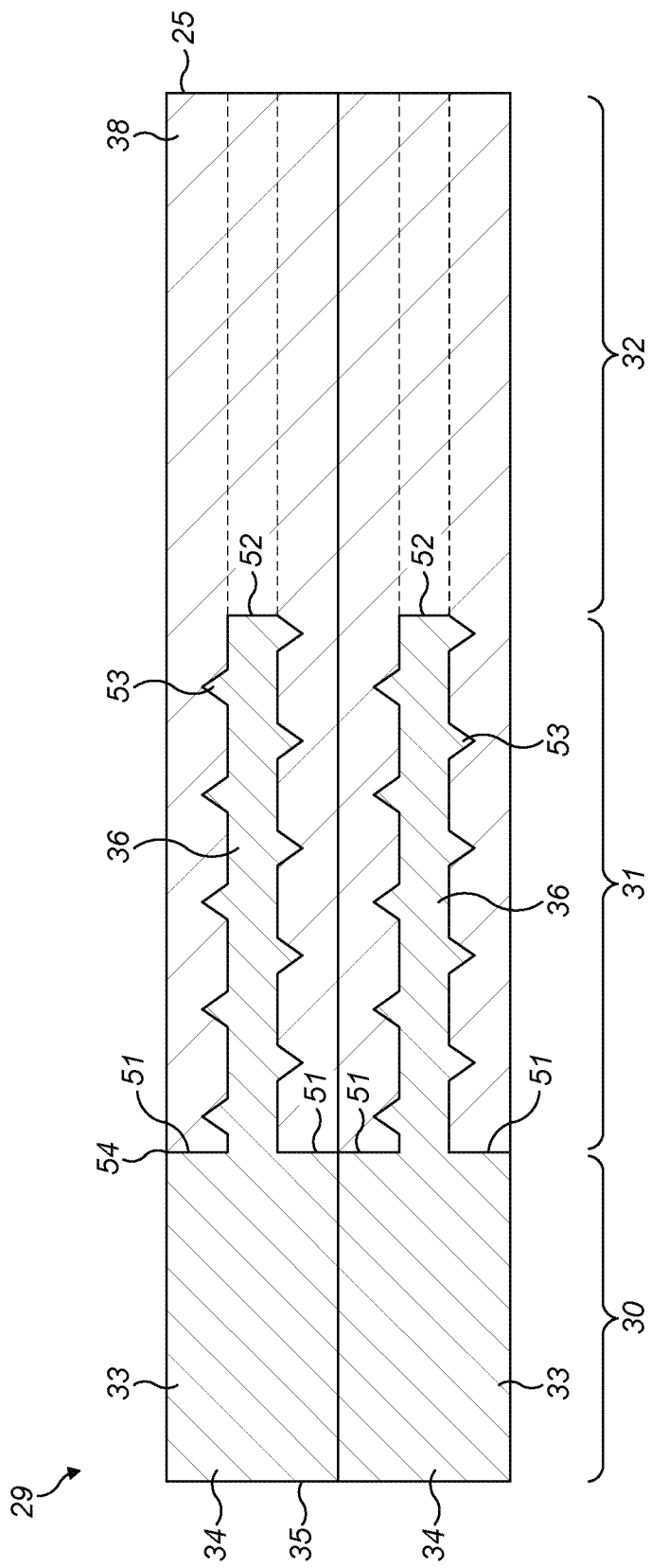
FIG. 6 shows a schematic partial cross-sectional view of a further alternative root end construction.

FIG. 6 shows another example of the root 29 which is the same in all respects to the root 29 of FIG. 5 except in that the cross-sectional profile of the metal sheets 33 in the transition section 31 differs from that of the example of FIG. 5. As such, the example construction of FIG. 6 is a preferred example of the example construction of FIG. 5.

In the example of FIG. 6, the first sections 34 of the metal sheets 33 may each have a constant thickness and textured second portions 36 which extend into the transition section 31.

In this example, the outer surfaces of the second portions 36 of the metal sheets 33 comprise a plurality of formations 53 which extend radially with respect to the spanwise extending axis of the metal section 30. The radially extending formations 53 comprise a plurality of discrete projections having generally spike like formation. It will be understood that the formations 53 could have any suitable form including cylindrical, rounded or square sided for example. In another example, the formations 53 may be formed by a roughening of the surfaces of the second portions 36 of the metal sheets 33. In another example, the formations 53 may comprise parallel or crossed grooves such as may be found on a file or a rasp.

The second portions 36 of the metal sheets 33 located in the transition section 30 are encapsulated within fibre composite material 38 which is continuous with the fibre composite material 38 of the fibre composite section 32 of the root 29. The second portions 36 are interleaved with the fibre composite material 38 in the transition section 31. The formations 53 help to improve the integrity of the connection between the fibre composite material 38 and the second portions 36 of the metal sheets 33. Nonetheless, it will be understood that the formations 53 are not essential and that some or all of the portions of the metal sheets 33 located in the transition section 31 may not comprise formations 53. Similarly, it is not necessary for each side of the second portions 36 comprise formations 53 and in some examples only one side of the second portions 36 may comprise formations 53.

In one example construction method, the depth of the fibre material may be matched to the depth of the steps 51 located in the metal sheets 33 at the spanwise outermost end 54 of the metal section 30, and to the depth of the spanwise outermost ends 52 of the second portions 36 so that during lay-up the fibre material may be readily interleaved with the second portions 36. For example, the steps 51 may have a depth of 0.5 mm, the second portions 36 may have a depth of 0.5 mm (excluding the formations 53), and the fibre material may have a depth of 0.5 mm. However, this is not essential and any other suitable dimensions and lay-up method may be used.

The metal sheets 33 are thin relative to their spanwise dimensions. For example, the thickness of the metal sheets 33 may be 1.5 mm at the proximal end 35 of the root 29 and their spanwise dimension may be 650 mm.

Figure 7A:
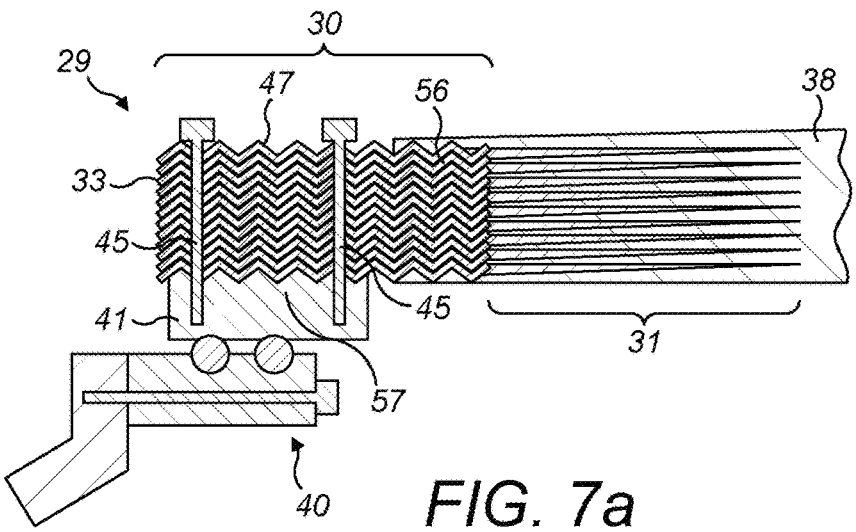
FIGS. 7a to 7c show schematic partial cross-sectional views of further alternative root end constructions attached to alternative examples of pitch bearings.
Figure 7B:
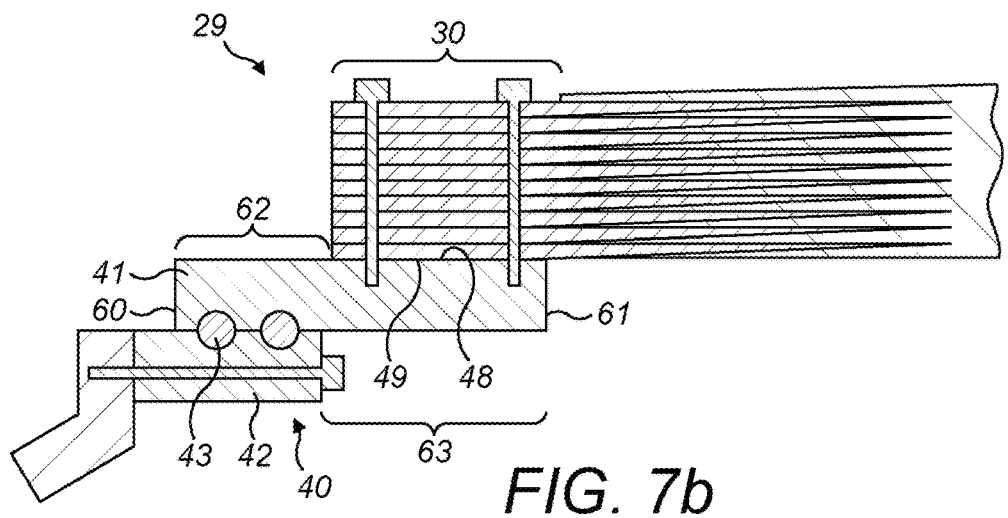
Figure 7C:
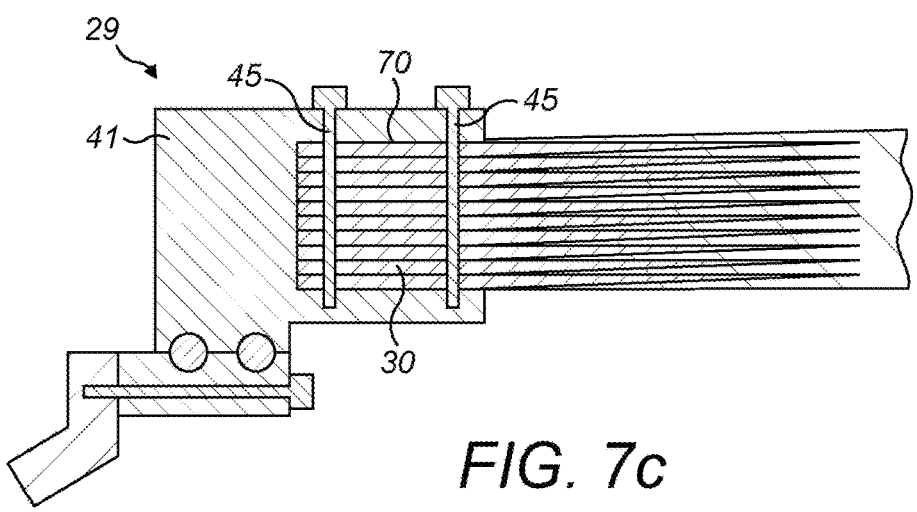

FIGS. 7a to 7c show schematic partial cross-sectional views of further example variations of the root construction of FIG. 5. In the example of FIG. 7a, the root 29 is attached to the inner ring 41 of the pitch bearing 40 in the same way as discussed above in respect of FIGS. 4 and 5. In this example, the metal sheets 33 of the metal section 30 comprise formations 56 which engage with complementary formations 56 located on an adjacent layer of metal sheet 33. In addition, the inner surface of the inner bearing ring 41 may comprise complementary surface formations 57 which engage with the surface formations 56 of the metal section 30.

The surface formations 56 provide an interlock between neighbouring layers of metal sheets 33 and between the outer surface of the metal portion 30 and the inner surface of the inner ring 41 of the pitch bearing. In the example shown in FIG. 7a radially extending bolts 45 are shown connecting the metal portion 30 to the inner ring 41. However, the bolts 45 may be dispensed with, the connection between the root 29 and the inner ring 41 being provided entirely by the interlocking formations 56, 57.

In the example of FIG. 7a the innermost surface 47 of the metal section 30 is shown as having formations 56 thereon. It will be understood that this surface may optionally not comprise formations 56.

The portions of the metal sheets 33 located in the transition section 31 of the root 29 as shown in FIG. 7a may be the same as those shown and described above in respect of FIG. 5. In an alternative example, the portions of the metal sheets 33 located in the transition section 31 may also comprise formations 56 to help improve the connection between the metal sheets 33 and the fibre composite material 38. The formations 56 in the metal section 30 and optionally in the transition section 31 may comprise discrete formations 53 as described above in relation to FIG. 6, or may be continuous formations such as curves or waves. Alternatively, the formations 56 may be formed by a roughening of the surfaces of the metal sheets 33 (for example by grit/sand blasting). In another example, the formations 56 may comprise parallel or crossed grooves such as may be found on a file or a rasp.

In the example of FIG. 7b, the root 29 is the same as described above with respect to FIG. 5 and is attached to the inner ring 41 of the pitch bearing 40 by bolts 45 in the same way as discussed above in respect of FIGS. 4 and 5. In this example, the inner ring 41 is elongate and comprises a proximal end 60 defining a hubwards end of the inner bearing ring 41, and a distal end 61 located at a spanwise distance from the proximal end 60. A hubwards section 62 of the inner bearing ring 41 extends from the proximal end 60 towards the distal end 61, and a bladewards section 63 of the inner bearing ring 41 extends from the distal end 61 towards the proximal end 60.

The circumferential outer surface 48 of the metal section 30 is only in contact with the circumferential inner surface 49 of the inner ring 41 in the bladewards section 63 of the inner ring 41 such that the contacting circumferential surfaces 48, 49 are located entirely in the bladewards section 63. The hubwards section 62 of the inner ring 41 operably engages the outer ring 42 of the pitch bearing via bearing elements (e.g. spherical rollers) 43 located between the inner 41 and outer 42 rings of the pitch bearing 40. This arrangement helps to dissociate the loads transferred from the root 29 to the inner ring 41 from the bearing elements 43 thereby reducing the forces that they encounter in use.

The example of FIG. 7c is similar to the example of FIG. 7b except in that the inner bearing ring 41 comprises an annular groove 70 within which the metal section 30 of the root 29 is received. In this example the metal section 30 of the root 29 may be attached to the inner ring 41 by the bolts 45 alone (bearing the forces predominantly in shear), or the bolts 45 may be preloaded as described above to produce friction force between the plurality of layers and the circumferential outer surfaces of the metal section 30 and the circumferential inner surfaces of the groove 70.

In this example, and in all of the examples described above, the metal section 30 of the root 29 may be attached to the inner 41 or outer 42 ring of the pitch bearing 40 by a shrink fit connection in which the inner 41 or outer 42 ring is heated so that it expands, the metal end 30 of the root 29 is positioned within or around inner 41 or outer 42 ring (as appropriate), or in the groove 70, and the ring 41, 42 is allowed to cool so that a shrink fit connection is formed between the ring 41, 42 and the metal section 30 of the root 29. This may also be achieved by cooling the metal section 30 of the root 29 before positioning it in or around the ring 41, 42 and allowing it to warm back up. If a shrink fit connection is used, the bolts 45 may be dispensed with. Alternatively, the bolts 45 may be used for additional security.

Figure 8:
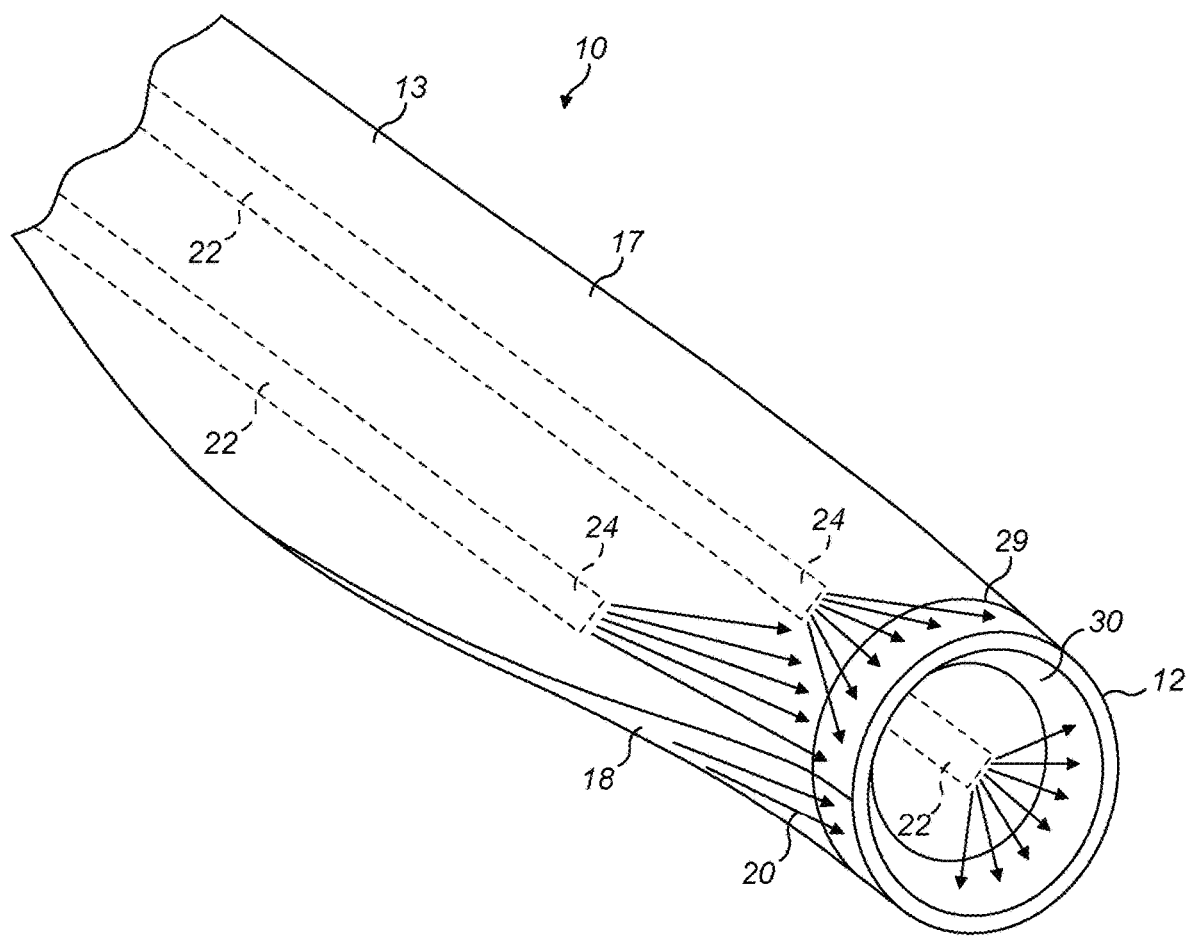
FIG. 8 shows a schematic view of part of a wind turbine blade construction.

Referring now to FIG. 8, a schematic view of a wind turbine blade 10 comprising a root 29 connected to a blade shell 13 is shown. The root 29 is configured as described above with reference to any one of FIGS. 4 to 7c. Because the metal section 30 of the root 29 is considerably stiffer than the glass fibre roots of the prior art, the spanwise innermost ends 24 of the carbon fibre spar caps 22 may be positioned closer to the root 29 than is possible in the prior art. Thus the stiffness of the entire wind turbine blade 10 is increased as the carbon fibre spars 22 are able to extend closer to the stiffer root 29. This is advantageous for the efficiency of the wind turbine blade 10. The metal section 30 of the root 29 is capable of bearing higher peak loads than is possible with the glass fibre roots of the prior art. This is advantageous as it allows less glass to be used in the construction of the root 29 providing both cost and environmental benefits.

In addition to these advantages, the root configurations described above have the added benefit in that the integrity of the bonds between the various layers of the root wall may be interrogated by ultrasonic non-destructive testing (NDT) methods throughout the entire depth of the root wall. This is not possible for roots comprising conventional spanwise extending bolt holes as the ultrasonic NDT equipment is unable to 'see' past the void formed in the glass fibre composite in which the insert for the stud bolt insert is received.

Figure 9A:
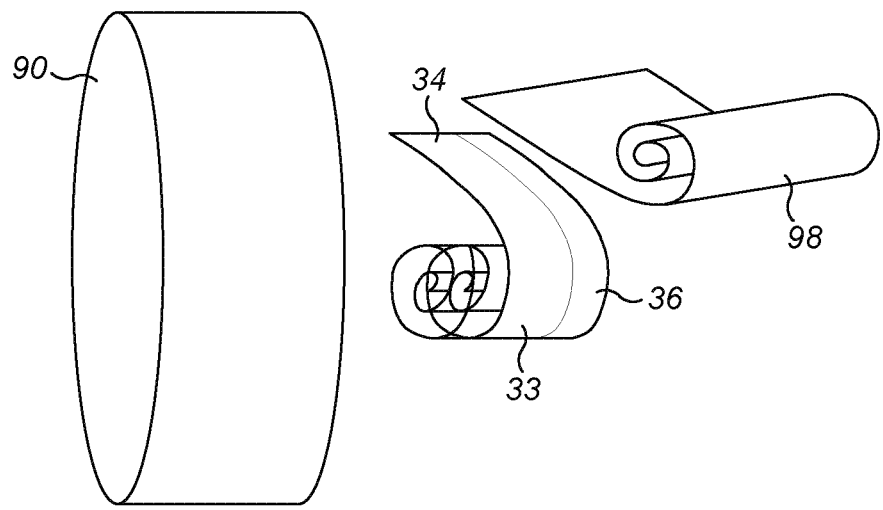
FIG. 9a shows a schematic isometric view of a manufacturing method for a root of a wind turbine blade.
Figure 9B:
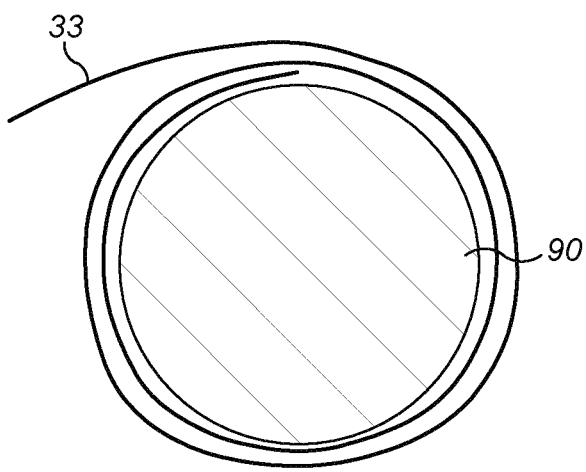
Figure 10:
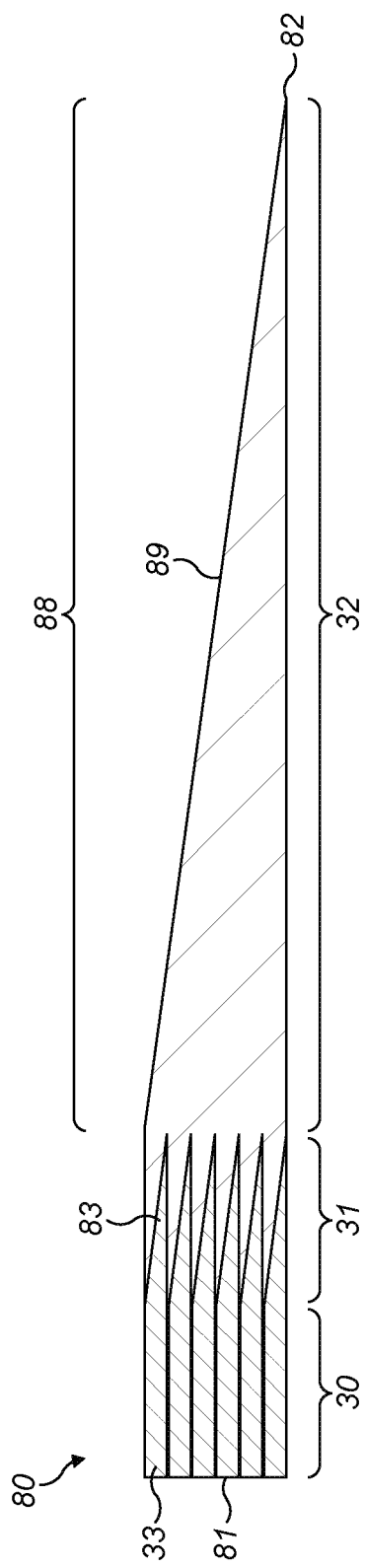
FIG. 10 shows a schematic partial cross-sectional view of a root of a wind turbine blade.

FIG. 9a shows a schematic view of a method of manufacture for a root ring 80 (see FIG. 10) and FIG. 9b shows a schematic cross-sectional view of the manufacturing method of FIG. 9a. FIG. 10 shows a schematic cross-sectional view of a root ring 80 made by the method of FIGS. 9a and 9b.

As will be described in greater detail below, the root ring 80 is incorporated into the layup of the blade shell 13 to form the root 29 of the complete wind turbine blade 10. As such, root ring 80 comprises a hub end 81 and a tipwards end 82 (in relation to the location of the root ring 80 in the completed wind turbine blade 10), the root ring 80 extending in a spanwise direction from the hub end 81 to the tipwards end 82.

The root ring 80 is formed with a plurality of layers of metal sheets 33 arranged one on top of the other such that the root ring 80, when incorporated into the blade shell 13 forms a root 29 as described above in relation to FIGS. 5 to 7c. The completed root ring 80 comprises a metal section 30, a transition section 31 and a fibre composite section 32.

Figure 9C:
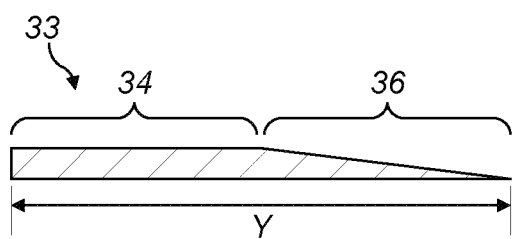

Referring to FIGS. 9a to 9c, the root ring 80 is fabricated on a mandrel 90 by interleaving and winding metal sheet material 33 and sheet fibre material 98 around a mandrel 90. Once wound onto the mandrel 90, the metal sheet material 33 forms the metal sheet layers of the root ring 80. Only the metal sheet material 33 is shown wound around the mandrel 90 in FIG. 9b as the cross-section is taken through a plane of the mandrel 90 corresponding to the location at which the metal section 30 of the root ring 80 is formed.

As shown in FIG. 9c, the metal sheet material 33 may comprise a first, constant thickness, portion 34 and a second, varying thickness portion, 36. The metal sheet material 33 is wound onto the mandrel 90 in layers so that the first portion 34 forms the metal section 30 of the root ring 80 and the second portion 36 is located in the transition section 31 of the root ring 80.

The metal sheet material 33 may have a thickness of 3 mm throughout the first portion 34 and a spanwise dimension Y of 650 mm. If, for example, ten layers of such metal sheet material 33 were wound onto the mandrel 90, the metal section 30 of the root ring 80 would have a radial depth of 30 mm (relative to a spanwise extending axis of the root ring 80), and the transition section 31 would comprise eighteen to twenty metal to composite fibre interfaces 83 (depending on the material forming the outermost layer of the transition section 31).

In another example, the metal sheet material 33 may have a thickness of 0.5 mm throughout the first portion 34 and a spanwise dimension Y of 650 mm. If sixty layers of such metal sheet material 33 were wound onto the mandrel 90, the metal section 30 of the root ring 80 would have a radial depth of 30 mm as before, but the transition section 31 would comprise six times the number of metal to composite fibre interfaces 83 as the previous example.

Mathematical modelling of the root ring 80 indicates that a root ring having six times the number of metal to composite fibre interfaces 83 would be six times stronger. Thus, the strength of the root ring 80—and by association the root 29 of the completed wind turbine blade 10—can be varied and tuned for specific applications by modification of the dimensions of the metal sheet material 33 and by selection of the number of layers in the root ring 80. This is advantageous as it allows for roots 29 of different strengths to be designed and made without needing to change the overall dimensions of the root. This is beneficial for the purposes of standardisation and overcoming design limitations imposed by road transport considerations (such as the height of bridges).

In addition to varying the dimensions of the metal sheet material 33 and the number of layers, the strength of the connection between root 29 and the pitch bearing 40 may be varied by changing the number and position of the radially extending bolts 45 (if used) and/or by varying the surface finish and interlocking formations (if present) of the metal sheets 33.

The method of winding the sheet materials 33, 98 on to the mandrel 90 is advantageous as it allows for multiple layers to be formed quickly without the need for large amounts of manual labour. In addition, all or part of the metal sheet material 33 may be roughened before being would onto the mandrel 90 to improve the bond between the metal sheet material 33 and the fibre composite material 38 in the finished root ring 80.

In one example, the metal sheet material 33 is overlapped with the sheet fibre material 98 before the overlapped sheets are wound on to the mandrel 90. In this way, once wound onto the mandrel 90, the metal sheet material 33 becomes interleaved with the sheet fibre material 98 in the completed root ring 80.

In another example, one layer of metal sheet material 33 is wound onto the mandrel 90 followed by one overlapping layer of the sheet fibre material 98 (or vice versa) so that the metal sheet material 33 becomes interleaved with the sheet fibre material 98 in the completed root ring 80.

In each case, the sheet fibre material 98 may overlap the metal sheet material 33 only in the vicinity of the second portion 36 of the metal sheet material 33 to form the transition section 31 of the root ring 80.

The sheet fibre material 98 may comprise pre-impregnated sheet fibre material. Alternatively, the sheet fibre material 98 may comprise dry sheet fibre material that is wound onto the mandrel 90 before being infused with resin and cured. With reference to FIG. 10, it will be understood that before curing of the pre-impregnated sheet fibre material, or before infiltration and curing of the dry sheet fibre material, the section of the assembled but uncured root ring 80 extending from the transition section 31 to the tipwards end 82 of the root ring 80 may be referred to as fibre section 88. The fibre section 88 becomes the composite fibre section 32 once cured.

A tapered inner surface 89 of the fibre composite section 32 of the root ring 80 can be formed during the winding process by winding a greater thickness of sheet fibre material 98 onto the mandrel 90 proximate the transition section 31 than is wound onto the mandrel 90 proximate the tipwards end 82 of the root ring 80. The cured fibre composite section 32 of the root ring 80 can be machined to obtain improved dimensional accuracy if required. In an alternative example method, the fibre section 88 can be wound onto the mandrel 90 at full thickness (i.e. the same or similar to the thickness of the metal 30 and transition 31 sections), cured and then machined to provide any particular cross-sectional profile, including tapered, as required.

Any of the root configurations discussed above in relation to FIGS. 4 to 7c may be made in the way described above in relation to FIGS. 9a to 9c.

Once completed, the root ring 80 is removed from the mandrel 90 and incorporated into the blade shell 13 to form the root 29 of the complete wind turbine blade 10. In one example this may be done by cutting the root ring 80 in half and incorporating each half into the windward 17 and leeward 18 half-shells of the blade shell 13. In this method, the root ring halves are placed partially or fully into the hubwards ends 21 of the half-shells 17, 18, overlayed with fibre material and cured. The two half-shells 17, 18, including the root ring halves, are then connected together to form the complete wind turbine blade shell 13 with a complete root 29.

In an alternative example, the finished root ring 80 may be incorporated into the blade shell 13 in one piece by positioning the complete root ring 80 partially or fully into the hubwards ends 21 of the windward 17 and leeward 18 half-shells, and connecting the root ring 80 to the half-shells 17, 18 by overlaying with fibre material and curing. This may be done after the windward 17 and leeward 18 half-shells have been connected together to form the blade shell 13. Alternatively, the root ring 80 may be connected to one half-shell before the other-half shell is placed in position and connected to the root ring 80 by overlaying with fibre material and curing as before.

In all of the root ring connection methods described above, the overlying fibre material may be pre-impregnated fibre material or dry fibre material which is infiltrated with resin before curing.

In all of the examples described herein, the second portion 36 of the metal sheet or sheets 33 located in the transition section 31 of the root 29 or root ring 80 is either linearly tapered or predominantly of constant thickness (optionally with radially extending formations). It will be understood that the second portion 36 of the metal sheet or sheets 33 located in the transition section 31 of a blade root 29 or root ring 80 may have any suitable cross-sectional profile including curved. The second portion 36 of the metal sheet or sheets 33 located in the transition section 31 may taper from one side of the metal sheet 33 so that one side of the curve metal sheet 33 has a linear cross-section. Alternatively, the metal sheet or sheets 33 may taper from both sides towards a common apex.

The example constructions of root and root ring described above provide a number of advantages over the prior art. In particular, the strength and stiffness of the root/root ring can be tuned for specific applications by modification of the dimensions and profiles of the metal sheet material and/or of the number of layers of metal sheet material. Such modifications impact the strength, stiffness and number/surface area of the of metal to fibre composite interfaces contained in the root/root ring. Roots/root rings of different capacities may therefore be designed and made without needing to change the overall dimensions of the root/root ring. This is beneficial for the purposes of standardisation and overcoming design limitations imposed by road transport considerations (such as the height of bridges).

The strength of the connection between root and the pitch bearing may also be designed for purpose by changing the number and position of the bolts (if used), and/or by varying the surface finish and interlocking formations (if present) of the metal sheets.

Because the metal section of the root/root ring is considerably stiffer than the glass fibre roots of the prior art, the spanwise innermost ends of the carbon fibre spar caps within the blade shell may be positioned closer to the root than is possible in the prior art. Thus the stiffness of the entire wind turbine blade may be increased as the carbon fibre spar caps are able to extend closer to the stiffer root. In addition, the metal section of the root is capable of bearing higher peak loads than is possible with the glass fibre roots of the prior art meaning that less glass can be used in the construction of the root providing both cost and environmental benefits.

The root configurations described above also have the benefit that the integrity of the bonds between the various layers of the root/root ring may be interrogated by ultrasonic non-destructive testing (NDT) methods throughout the entire depth of the root wall. This is not possible for roots comprising conventional spanwise extending bolt holes as the ultrasonic NDT equipment is unable to 'see' past the void formed in the glass fibre composite in which the insert for the stud bolt insert is received.

The method of winding the sheet materials on to the mandrel is advantageous as it allows for multiple layers to be formed quickly without the need for large amounts of manual labour. In addition, all or part of the surface of the metal sheet material may be treated before being wound onto the mandrel to increase the friction between the layers of metal sheet material in the metal section, and to help improve the bond between the metal sheet material and the fibre composite material in the finished root ring. The surface treatment may comprise a mechanical roughening process such as grit blasting for example, and/or may comprises a chemical treatment process.

The invention claimed is:

1. A method of manufacturing a root ring for a wind turbine blade, the root ring comprising a hub end and a tipwards end, the root ring extending in a spanwise direction from the hub end to the tipwards end, the method comprising:
    winding metal sheet material onto a mandrel to form a metal section proximate the hub end of the root ring;
    winding sheet fiber material onto the mandrel to form a fiber section proximate the tipwards end of the root ring; and
    interleaving the metal sheet material with the sheet fiber material to form a transition section of the root ring, wherein the transition section is located between the metal section and the fiber section.

2. The method of claim 1, comprising overlapping the metal sheet material with the sheet fiber material before the metal sheet and sheet fiber materials are wound on to the mandrel.

3. The method of claim 1, comprising winding a layer of metal sheet material onto the mandrel before winding a layer of sheet fiber material onto the mandrel.

4. The method of claim 1, comprising treating at least part of the metal sheet material to alter the surface properties of the metal sheet material before it is wound onto the mandrel.

5. The method of claim 1, wherein the metal sheet material comprises a first portion located adjacent a first edge of the metal sheet material, and a second portion located adjacent a second edge of the metal sheet material, wherein the thickness of the second portion tapers away from the first portion towards the second edge of the metal sheet material, the method comprising winding the metal sheet material onto the mandrel so that the first portion of the metal sheet material is located in the metal section of the root ring, and the second portion of the metal sheet material is located in the transition section of the root ring.

6. The method of claim 1, wherein the sheet fiber material comprises pre-impregnated sheet fiber material, wherein the method comprising curing the pre-impregnated sheet fiber material after it has been wound onto the mandrel.

7. The method of claim 1, wherein the sheet fiber material comprises dry sheet fiber material, wherein the method comprises infusing the sheet fiber material with resin after it has been wound onto the mandrel and curing the resin.

8. The method of claim 1, comprising winding a greater thickness of sheet fiber material onto the mandrel at an end of the fiber section located proximate the transition section than is wound onto the mandrel at an opposing end of the fiber section located proximate the tipwards end of the root ring such that the thickness of the fiber section tapers towards the tipwards end of the root ring.

9. The method of claim 1, comprising machining an outer surface of the fiber section to form a tapered wall thickness profile in the fiber section of the root ring.

10. A method of forming a wind turbine blade, the method comprising:
    forming a root ring using the method of claim 1;
    removing the root ring from the mandrel;
    providing a windward half-shell and a leeward half-shell of a wind turbine blade shell, wherein the windward half-shell and the leeward half-shell each comprise a hubwards end and a tip end, wherein each half-shell extends in a spanwise direction from the hubwards end to the tip end;
    connecting the windward half-shell to the leeward half-shell to form a wind turbine blade shell;
    positioning the complete root ring at the hubwards ends of the windward half-shell and the leeward half-shell; and
    connecting the root ring to the windward half-shell and the leeward half-shell.

11. The method of claim 10, wherein positioning the root ring at the hubwards ends of the windward half-shell and the leeward half-shell comprises positioning the root ring at least partially between the windward half-shell and the leeward half-shell.

12. The method of claim 10, wherein connecting the root ring to the windward half-shell and the leeward half-shell comprises:
    laying one or more sheets of fiber material over the intersections between the root ring and the windward half-shell and the leeward half-shell; and
    curing a resin infiltrated or impregnated within the sheets of fiber material.

13. The method of claim 10, wherein connecting the root ring to the windward half-shell and the leeward half-shell comprises connecting the root ring to one of the windward or leeward half-shells before connecting the root ring to the other of the windward or leeward half-shells.

* * * * *